US011858109B2

(12) United States Patent
Lachica Koch et al.

(10) Patent No.: US 11,858,109 B2
(45) Date of Patent: Jan. 2, 2024

(54) SIDE HANDLE FOR AN ELECTRIC HAND-HELD POWER TOOL

(71) Applicant: Hilti Aktiengesellschaft, Schaan (LI)

(72) Inventors: Daniela Lachica Koch, Augsburg (DE); Philipp Amelung, Magdeburg (DE); Martin Siemen, Westerstede (DE); Manuel Roelecke, Braunschweig (DE); Konstantin Wullbrandt, Magdeburg (DE); Tobias Ströer, Cloppenburg (DE); Isabel Völz, Magdeburg (DE); Hui Sun, Magdeburg (DE); Dogukan Mintas, Geisenfeld (DE); Michael Göttlinger, Landshut (DE); Julian Janke, Regensburg (DE); Ernst-Rudolf Lübkert, Landsberg am Lech (DE); Markus Sommer, Westendorf (DE); Georg Kugelmann, Jettingen/Scheppach (DE); Maximilian Kummer, Ulm (DE); Steffen Mucha, Landsberg am Lech (DE); Silke Topp, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 106 days.

(21) Appl. No.: 17/617,423

(22) PCT Filed: Jun. 16, 2020

(86) PCT No.: PCT/EP2020/066631
§ 371 (c)(1),
(2) Date: Dec. 8, 2021

(87) PCT Pub. No.: WO2020/260071
PCT Pub. Date: Dec. 30, 2020

(65) Prior Publication Data

US 2022/0241953 A1 Aug. 4, 2022

(30) Foreign Application Priority Data

Jun. 26, 2019 (EP) .................................... 19182592

(51) Int. Cl.
*B25G 1/00* (2006.01)
*B25F 5/02* (2006.01)

(52) U.S. Cl.
CPC .................................... *B25F 5/026* (2013.01)

(58) Field of Classification Search
CPC .......... Y10S 16/90; B25F 5/024; B25F 5/026; B25F 5/02; B25F 5/006; B24B 23/00;
(Continued)

(56) References Cited

U.S. PATENT DOCUMENTS 6,317,930 B1 11/2001 Hung et al.
2009/0178520 A1 7/2009 Engelfried et al.
(Continued)

FOREIGN PATENT DOCUMENTS

CN 101585184 A * 11/2009 .............. B25F 5/006
CN 102145486 B * 12/2014 .............. B25F 5/026
(Continued)

OTHER PUBLICATIONS

International Search Report of PCT/EP2020/066631, dated Sep. 18, 2020.

*Primary Examiner* — Chuck Y Mah
(74) *Attorney, Agent, or Firm* — Davidson, Davidson & Kappel, LLC

(57) ABSTRACT

Side handle for an electric hand-held power tool, wherein the side handle has a grip region designed to be gripped by a user, and a clamping unit, by which the side handle can be releasably fastened to a machine neck of the hand-held power tool, wherein the clamping unit has an operating element, by which the clamping unit is able to be clamped and unclamped, wherein the operating element, when the
(Continued)

clamping unit is in the clamped state, is substantially flush with the surface of the grip region. The operating element is preferably in the form of a clamping lever.

21 Claims, 4 Drawing Sheets

(58) Field of Classification Search
CPC ......... B24B 23/005; B24B 29/00; B27B 9/00; B25G 1/06; B25G 1/00; B25G 3/38
See application file for complete search history.

(56) References Cited

U.S. PATENT DOCUMENTS

| | | | | |
|---|---|---|---|---|
| 2009/0307875 | A1* | 12/2009 | Nakashima ............. | B25F 5/026 16/436 |
| 2010/0064480 | A1 | 3/2010 | Martin et al. | |
| 2010/0282484 | A1* | 11/2010 | Moessnang ............. | B25F 5/026 16/421 |
| 2012/0312572 | A1* | 12/2012 | Nemetz ................... | B25F 5/006 248/220.22 |
| 2015/0209952 | A1 | 7/2015 | Nishii et al. | |

FOREIGN PATENT DOCUMENTS

| | | | | |
|---|---|---|---|---|
| EP | 1 974 867 | B1 | | 12/2009 |
| JP | 09109065 | A | * | 4/1997 |
| JP | 2006321008 | A | * | 11/2006 |

* cited by examiner

SIDE HANDLE FOR AN ELECTRIC HAND-HELD POWER TOOL

The present invention relates to a side handle for an electric hand-held power tool. The side handle has a grip region designed to be gripped by a user, and a clamping unit. By means of the clamping unit, the side handle can be releasably fastened to a machine neck of the hand-held power tool, wherein the clamping unit has an operating element, by means of which the clamping unit is able to be clamped and unclamped.

BACKGROUND

Side handles of the type mentioned at the beginning are known in principle from the prior art. EP 1 974 867 B1 discloses a grip for a hand-held tool, having a pair of clamp halves, an operating device that has an operating part suitable for opening and closing the clamp halves relative to the holder part, and a grip body configured to be gripped by an operator.

SUMMARY OF THE INVENTION

An object of the present invention is to provide an ergonomic side handle.

The present invention provides that the operating element, when the clamping unit is in the clamped state, is substantially flush with the surface of the grip region. By way of the operating element configured according to the invention, the side handle, in particular the grip region thereof, can be gripped particularly comfortably by a user, who is now advantageously not impeded by an operating part projecting beyond the grip region, for example knurled knobs known from the prior art. At the same time, a clamping screw used typically for clamping can be embodied in a comparatively short manner, with the result that both a saving of material and a saving of weight can be achieved.

It has proven advantageous for the operating element to be in the form of a clamping lever. In a particularly preferred configuration, the clamping lever is arranged on the side handle so as to be rotatable about an axis of rotation relative to the grip region. Preferably, the axis of rotation extends perpendicularly to a working axis of the hand-held power tool when the side handle is fastened to the hand-held power tool. In a further particularly preferred configuration, the rotation of the clamping lever about the axis of rotation is limited to 360 degrees, preferably to 180 degrees. In this regard, it has been found that in side handles of the prior art, it is typically necessary to turn the operating part multiple times in a time-consuming manner in order to adjust and move the side handle to the desired position both about the working axis of the hand-held power tool and into the tilt axis. In other words, in side handles of the prior art, it is necessary that a band clamp, which be turned multiple times, i.e. through more than 360 degrees, by a clamping screw cooperating with the operating part.

According to a further preferred configuration, the rotation of the clamping lever about the axis of rotation is limited to 340 degrees. As a result, the band clamp holders can be moved or pushed further away from one another, such that it is easier to mount the side handle on and remove it from a hand-held power tool.

It has been found to be advantageous when a stop is formed on the clamping lever, said stop being formed preferably in a complementary manner to a counterpart stop provided on the grip region. The grip region can have a hollow profile or can be formed substantially thereby.

The clamping unit may have two clamping bodies in the form of cylinder portions, which are each oriented coaxially with a clamping screw, extending along the axis of rotation, of the clamping unit. Preferably, the clamping unit has a band clamp holder and a band clamp provided for encircling the machine neck. Preferably, one of the clamping bodies in the form of a cylinder portion is formed in one piece with the clamping lever or at least connected thereto for conjoint rotation. The band clamp holder can have two holding bodies, preferably exactly two holding bodies. The clamping screw can be connected to the clamping lever for conjoint rotation, preferably via a hexagon.

In one particular configuration, the band clamp is mounted or is able to be mounted in the band clamp holder. Advantageously, the band clamp is designed without a through-bore intended for a clamping screw. This has the advantage that the side handle is able to be preassembled at the factory is able to be mounted merely by demounting and remounting the band clamp on hand-held power tools, the tool receptacle of which has a larger diameter than the machine neck thereof. In side handles of the prior art, under such circumstances, it is typically necessary to substantially completely remove the side handle, but at least the clamping unit. As a result of the advantageous configuration of the band clamp holder with a mountable band clamp, a saving of time and thus also a saving of costs can be realized during assembly.

It has likewise been found to be advantageous when the band clamp holder has a depression, recessed in a radial direction, with a holding lug, such that, instead of the mounted band clamp with a first diameter, a second band clamp with a second diameter different than the first diameter is able to be mounted. The holding lug can have a spring contact face, the curvature of which is greater than a clamping face, in contact with the machine neck, of the band clamp holder. Advantageously, one and the same band clamp holder can be used for hand-held power tools with different machine neck diameters. Advantageously, a system made up of a side handle with a plurality of band clamps with different diameters is provided, wherein each of the band clamps is able to be mounted in one and the same band clamp holder.

In a further preferred configuration, the band clamp holder has two mutually coaxial holding bodies, wherein at least one of the holding bodies is able to be clamped together with one of the clamping bodies in the form of a cylinder portion via a cone/hollow cone pairing. A second of the holding bodies can is able to be clamped together with a grip end piece of the side handle via a cone/hollow cone pairing. The grip end piece can be formed in one piece with a grip region. The cone/hollow cone pairing can be assigned a cone formed on the second clamping body and/or a hollow cone formed on the first holding body, or vice versa. A cone/hollow cone pairing can be provided between the grip end piece and the second holding body.

The band clamp holder may have, on a side facing the machine neck, at least one surface portion that, compared with the remaining part of the clamp holder, has a higher coefficient of friction and/or a higher modulus of elasticity.

According to further independent subject matter for which protection is sought, a side handle for an electric hand-held power tool is provided, wherein the side handle has a grip region designed to be gripped by a user, and a clamping unit, by means of which the side handle can be releasably fastened to a machine neck of the hand-held power tool, wherein the clamping unit has an operating element, by means of which the clamping unit is able to be clamped and unclamped. The clamping unit also has a band clamp holder and a band clamp provided for encircling the machine neck, wherein the band clamp is mounted in the band clamp holder and is designed preferably without a through-bore intended for a clamping screw. The band clamp holder may have a depression, recessed in a radial direction, with a holding lug, such that, instead of the mounted band clamp with a first diameter, a second band clamp with a second diameter different than the first diameter is able to be mounted, wherein the holding lug has preferably a spring contact face, the curvature of which is greater than a clamping face, in contact with the machine neck, of the band clamp holder. The side handle can be configured in a corresponding manner by the features described with reference to the exemplary embodiments of the side handle according to the invention.

According to further independent subject matter for which protection is sought, a side handle for an electric hand-held power tool is provided, wherein the side handle has a grip region designed to be gripped by a user, and a clamping unit, by means of which the side handle can be releasably fastened to a machine neck of the hand-held power tool, wherein the clamping unit has an operating element, by means of which the clamping unit is able to be clamped and unclamped. The band clamp holder may have, on a side facing the machine neck, at least one surface portion that, compared with the remaining part of the clamp holder, has a higher coefficient of friction and/or a higher modulus of elasticity. The side handle can be configured in a corresponding manner by the features described with reference to the exemplary embodiments of the side handle according to the invention.

According to further independent subject matter for which protection is sought, a side handle for an electric hand-held power tool is provided, wherein the side handle has a grip region designed to be gripped by a user, and a clamping unit, by means of which the side handle can be releasably fastened to a machine neck of the hand-held power tool, wherein the clamping unit has an operating element, by means of which the clamping unit is able to be clamped and unclamped. The clamping unit may have two clamping bodies in the form of cylinder portions, which are each oriented coaxially with a clamping screw, extending along the axis of rotation, of the clamping unit, and also a band clamp holder having two mutually coaxial holding bodies, wherein at least one of the holding bodies is able to be clamped together with one of the clamping bodies in the form of a cylinder portion via a cone/hollow cone pairing. The side handle can be configured in a corresponding manner by the features described with reference to the exemplary embodiments of the side handle according to the invention.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures.

DETAILED DESCRIPTION

Figure 1B:
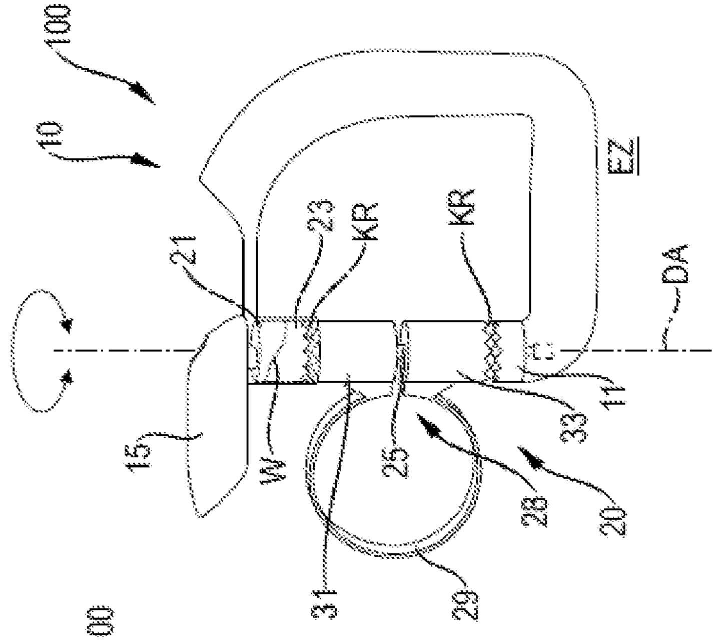
FIGS. 1A and 1B show a first preferred exemplary embodiment of a side handle according to the invention.
Figure 1A:
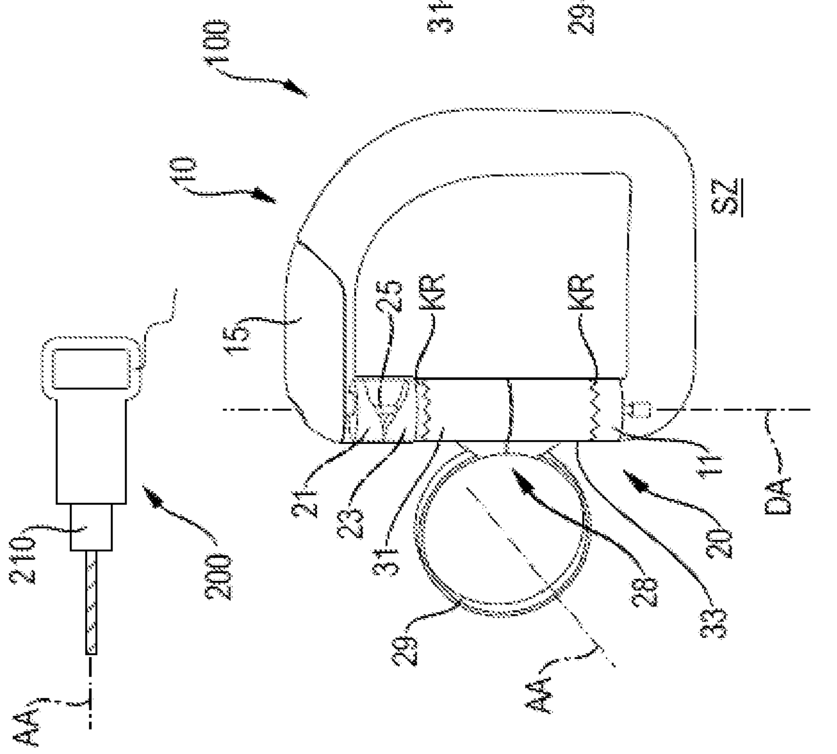

A preferred exemplary embodiment of a side handle 100 according to the invention for an electric hand-held power tool 200, for example a hammer drill, is illustrated in FIGS. 1A and 1B. The side handle 100 has a grip region 10 designed to be gripped by a user, and a clamping unit 20, by means of which the side handle 100 can be releasably fastened to a machine neck 210 of the hand-held power tool 200. The clamping unit 20 has an operating element in the form of a clamping lever 15, by means of which the clamping unit 20 is able to be clamped and unclamped, wherein FIG. 1A shows the clamped state SZ and FIG. 1B shows the unclamped state EZ.

When the clamping unit 20 is in the clamped state SZ, the operating element in the form of a clamping lever 15 is flush or at least substantially flush with the surface of the grip region 10. The clamping lever 15 is arranged on the side handle 100 so as to be rotatable about an axis of rotation DA relative to the grip region 10, wherein the axis of rotation DA extends perpendicularly to a working axis AA of the hand-held power tool 200 when the side handle 100 is fastened to the hand-held power tool 200.

The grip region 10 can consist of or exhibit for example polypropylene, ABS, polyamide or polyurethane. The clamping lever 15 can consist of the same material as the grip region 10. The clamping lever 15 can consist of or exhibit a thermoplastic elastomer (TPE).

The clamping unit 20 of the exemplary embodiment in FIGS. 1A and 1B has two clamping bodies 21, 23 in the form of cylinder portions, which are each oriented coaxially with a clamping screw 25, extending along the axis of rotation DA, of the clamping unit 20. As is readily apparent from FIG. 1B, the clamping bodies 21, 23 are formed in a complementary manner to one another, i.e. they form substantially a cylinder when they rest against one another with minimum length (FIG. 1B), wherein the clamping bodies 21, 23 are substantially in full contact along the wave profile W. The wave profile W does not necessarily have to have a straight section profile, but rather, as in the exemplary embodiment in FIG. 1, it can have a rudimentary sinusoidal profile. The clamping lever 15 and the first clamping body 21 can be formed integrally with one another.

As is apparent from FIGS. 1A and 1B, the clamping unit 20 also has a band clamp holder 28 and a band clamp 29 provided for encircling the machine neck 210. The band clamp holder 28 has two mutually coaxial holding bodies 31, 33, to which the band clamp 29 is fastened. Provided both between the second clamping body 23 and the first holding body 31 and between the second holding body and a grip end piece 11 is a crown toothing KR, which, when the clamping unit is in the clamped state SZ as shown in FIG. 1A, prevents the grip region 10 from rotating about the axis of rotation DA. In the clamped state SZ, the clamping bodies 21, 23 rest with maximum length on one another—rotated through 180 degrees about the axis of rotation with respect to one another with regard to FIG. 1B. In other words, a rotation of the clamping lever through 180 degrees is sufficient to clamp and unclamp the clamping unit 20. Other wave profiles are possible.

Figure 2B:
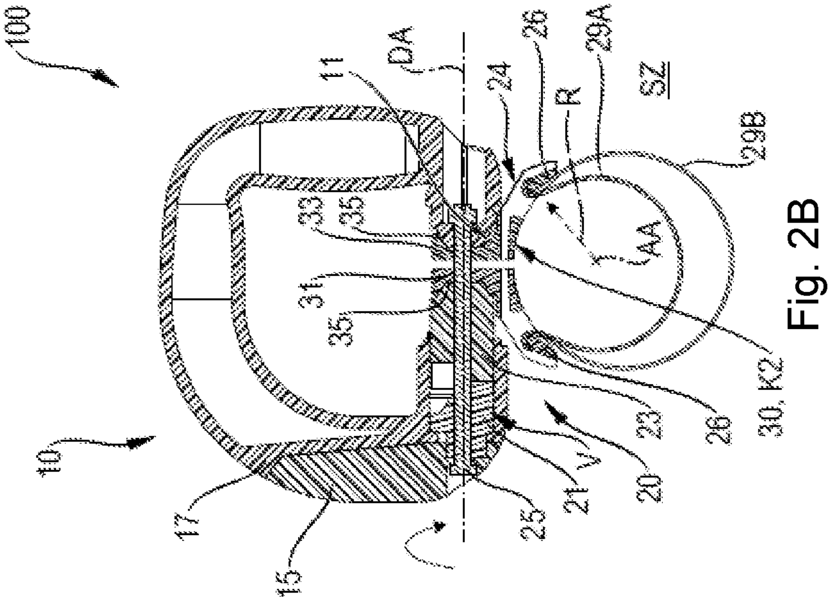
FIGS. 2A and 2B show a second preferred exemplary embodiment of a side handle according to the invention.
Figure 2A:
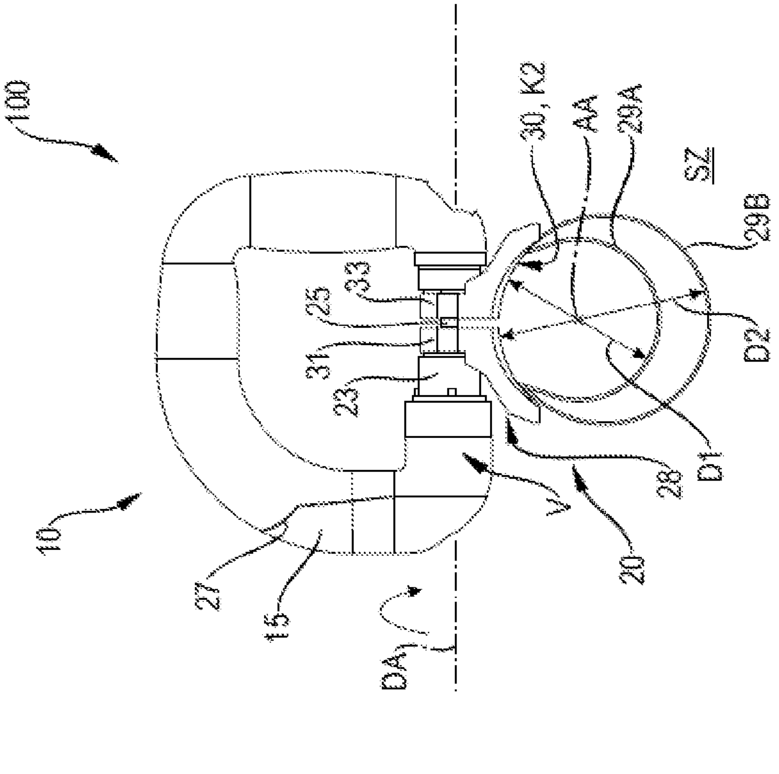

A second preferred exemplary embodiment of a side handle 100 according to the invention is illustrated in FIGS. 2A and 2B. Here, FIG. 2A shows a plan view coaxially with the working axis AA and FIG. 2B shows a section through the axis of rotation DA.

When the clamping unit 20 is in the clamped state SZ, the operating element in the form of a clamping lever 15 is flush or at least substantially flush with the surface of the grip region 10. Both FIG. 2A and FIG. 2B show the clamped state SZ. In addition to the clamping lever 15 shown in FIGS. 1A and 1B, a stop 27 is formed on the clamping lever 15 of the exemplary embodiment in FIG. 2A, said stop 27 being formed in a complementary manner to a counterpart stop 17 provided on the grip region 10 (see, e.g., FIG. 2B). The stop 27 is formed by a recess at the outer end of the clamping lever 15, this being readily apparent for example in FIG. 4A. The counterpart stop 17 formed in a complementary manner is formed in one piece with the grip region 10. As a result of the stop 27, it is possible to turn out the clamping lever only in one direction about the axis of rotation (out of the plane of the figure in FIGS. 2A and 2B). At the same time, rotation of the clamping lever 15 about the axis of rotation DA is limited mechanically to 360 degrees, in this case for example to less than 360 degrees, by the stop 27.

The clamping unit 20 has two clamping bodies 21, 23 in the form of cylinder portions, which are each oriented coaxially with a clamping screw 25, extending along the axis of rotation DA, of the clamping unit 20. In this case, the first clamping body 21 is located entirely within a volume V of the side handle, whereas the second clamping body 23—at least partially in the clamped state SZ, projects beyond the volume V along the axis of rotation DA.

The clamping unit 20 of the side handle in FIGS. 2A and 2B also has a band clamp holder 28 and a band clamp 29A, 29B provided for encircling the machine neck 210, wherein the band clamp 29A, 29B is mounted in the band clamp holder 28 and is designed preferably without a clamping screw 25 passing through the band. This is readily apparent from FIG. 2B. As a result of it being possible to mount the band clamps 29A, 29B and in particular the lack of any through-bores intended for a clamping screw 25, the band clamps 29A, 29B—with the side handle 200 otherwise fully assembled—can be replaced relatively easily.

The band clamp holder 28 in FIGS. 2A and 2B is advantageously configured both a band clamp 29A with a small diameter D1 and a band clamp 29B with a large diameter D2. In FIGS. 2A and 2B 2, both band clamps 29A, 29B are illustrated at the same time, in order to make it clear that both band clamps 29A, 29B are mountable in one and the same band clamp holder 28, to be more precise in a holding lug 26 of the band clamp holder 28. In use, only one of the band clamps 29A, 29B is installed, of course.

Figure 3B:
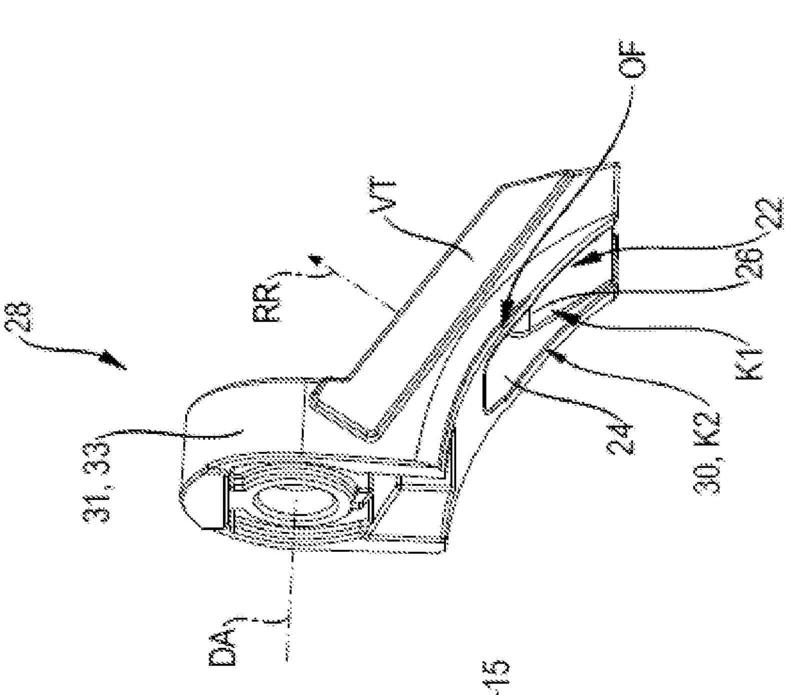
FIGS. 3A and 3B show detail illustrations of the exemplary embodiment in FIG. 2.

The band clamp holder 28 has a depression 24, recessed in a radial direction RR, with a holding lug 26, this being readily apparent from the detail illustration in FIG. 3B. The holding lug 26 is configured such that, instead of the mounted band clamp 29A with the first diameter D1, the second band clamp 29B with the second diameter D2, different than the first diameter, is able to be mounted. For this purpose, the holding lug 26 has a spring contact face 22 (cf. FIGS. 3A and 3B), the curvature K1 of which is greater than a curvature K2 of a clamping face 30, in contact with the machine neck 210, of the band clamp holder 28. It is readily apparent from FIG. 3A how the band clamp 29B with the large diameter closely follows the spring contact face 22 of the holding lug 26.

Back to FIGS. 2A and 2B, it is readily apparent that the band clamp holder 28 has two mutually coaxial holding bodies 31, 33. A first of the holding bodies 31 is able to be clamped together with one of the clamping bodies 23 in the form of a cylinder portion (which projects at least partially beyond the volume V along the axis of rotation DA in the clamped state SZ) via a cone/hollow cone pairing 35 (cf. also FIG. 3A). In the same way, such a cone/hollow cone pairing 35 can be provided between the second holding body 33 and a grip end piece 11. In the exemplary embodiment in FIGS. 2A and 2B, the grip end piece 11 is formed in one piece with the handle 10. Alternatively, the grip end piece 11 and the handle can be mutually separate parts.

Figure 3A:
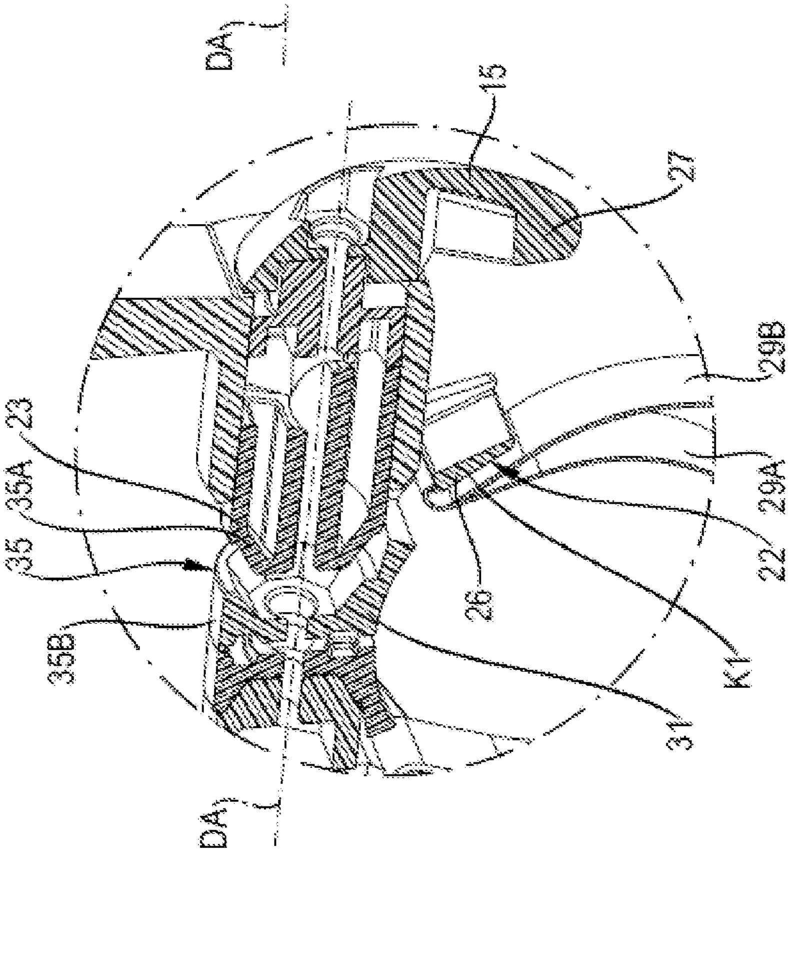

The cone/hollow cone pairing 35, to which a cone 35A formed on the second clamping body 23 and a hollow cone 35B formed on the first holding body 31 are assigned, will now be explained in more detail with reference to FIG. 3A. As a result of the cone/hollow cone pairing 35, it is possible to pivot the handle 10 about the axis of rotation DA in a stepless manner. This is in contrast to a crown toothing KR provided in the exemplary embodiment in FIG. 1. As a result of the cone/hollow cone pairing 35, wear-independent clamping of the clamping unit 20 is possible, since the force-fitting cone/hollow cone pairing 35 automatically adjusts itself in the direction of the axis of rotation DA in the event of any wear. As an alternative to a stepless configuration of the cone/hollow cone pairing 35, the cone 35A and/or the hollow cone 36B can be chamfered. Thus, for example the hollow cone 35B that is readily apparent in FIG. 4C has eight cone flanks 35F.

FIG. 3B shows a holding body 31, 33 as part of the band clamp holder 28. The depression 24 formed therein the function of the holding lug 26 have already been explained above. The holding body 31, 33 has, on a side facing the machine neck 210, at least one surface portion OF that, compared with the remaining part VT of the band clamp holder 28, has a higher coefficient of friction. Thus, the holding body 31, 33 can consist for example substantially of a comparatively hard ABS plastic and the surface portion OF of a comparatively soft thermoplastic elastomer or some other rubberlike material. This is in order to compensate for any tolerances between the machine neck and the band clamp holder and/or to increase the friction between these components. Alternatively, a first and second cutout can be provided in the band clamp 29 at the ends. The first cutout is used to position a first holding element and the second cutout is used to position a second holding element. Both the first and the second holding element are connected to the band clamp 29 by a clip mechanism. Furthermore, each holding element is manufactured from acrylonitrile-butadiene rubber. Acrylonitrile-butadiene rubber can also be referred to as nitrile rubber (AB) or nitrile butadiene rubber (NBR).

Figures 4A, 4B, 4C:
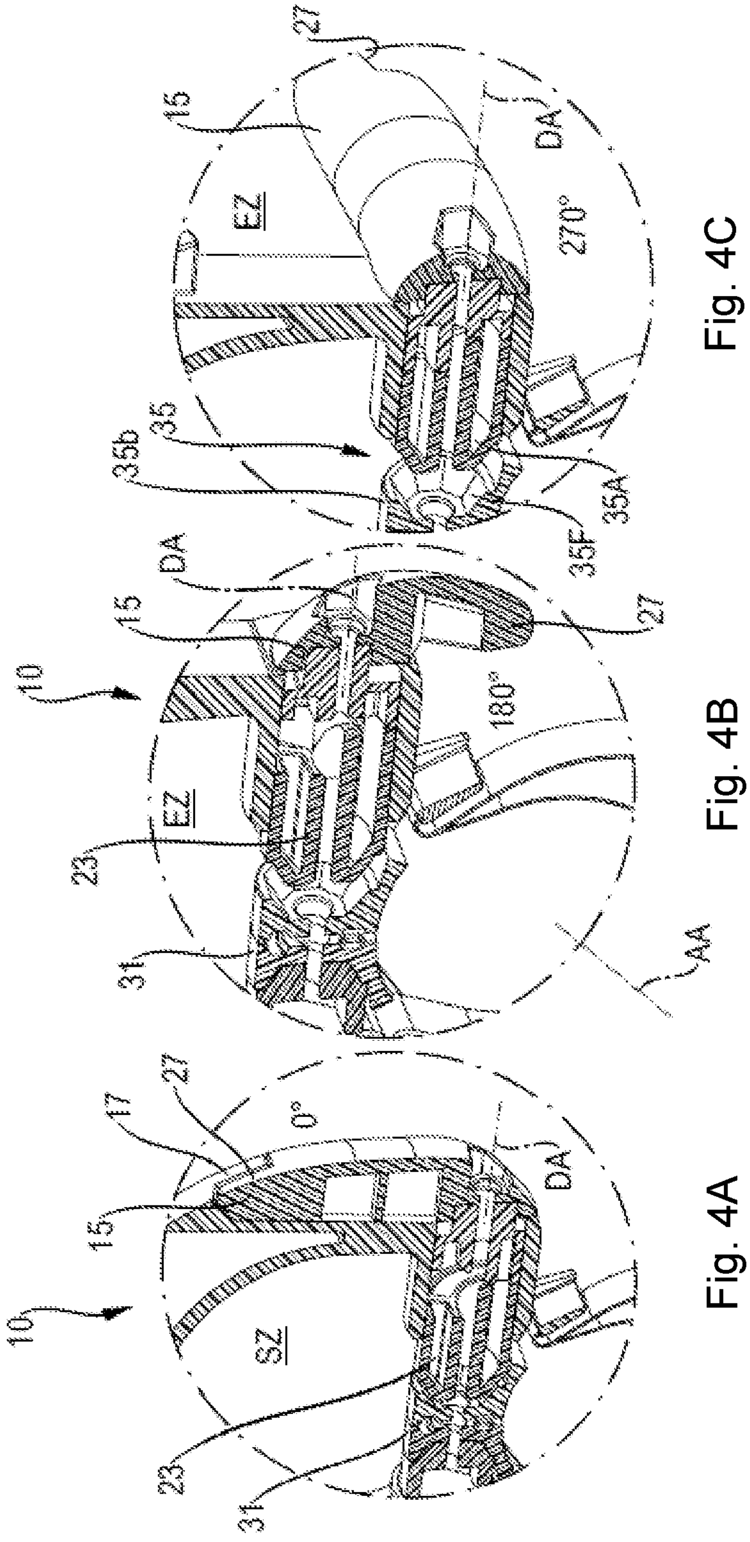
FIGS. 4A, 4B and 4C show further detail illustrations of the exemplary embodiment in FIG. 2.

Finally, FIGS. 4A, 4B and 4C show detail views of the side handle 100, wherein the clamping lever 15 is in each case in different rotational positions. FIG. 4A shows the clamped state SZ, in which the clamping lever has been deflected through 0 degrees and thus the stop 27 formed on the clamping lever rests against the complementary counterpart stop 17 formed integrally with the handle 10. The second clamping body 23 and the first holding body 31 (and the second holding body 33 and the grip end piece 11, which cannot be seen here) are pressed against one another, such that the grip region 10 cannot be rotated about the axis of rotation DA.

FIG. 4B shows the unclamped state SZ, in which the clamping lever has been deflected through 180 degrees. The second clamping body 23 is spaced apart from the first holding body along the axis of rotation DA. The grip region 10 can be rotated or pivoted about the axis of rotation DA as desired. At the same time, the entire side handle can be rotated or pivoted about the working axis AA of a hand-held power tool that is not shown here. Equally, the entire side handle cannot be rotated or pivoted about the working axis AA of a hand-held power tool that is not shown here.

Finally, FIG. 4C shows the unclamped state SZ, in which the clamping lever has been deflected through 270 degrees. The second clamping body 23 is spaced further apart from the first holding body along the axis of rotation DA than in FIG. 4B. In the state shown in FIG. 4C, the side handle can be removed from the machine neck, which is not shown here.

LIST OF REFERENCE SIGNS

10 Grip region
11 Grip end piece
15 Clamping lever
17 Counterpart stop
20 Clamping unit
21 First clamping body
22 Spring contact face
23 Second clamping body
24 Depression
25 Clamping screw
26 Holding lug
27 Stop
28 Band clamp holder
29 Band clamp
29A Band clamp with a small diameter
29B Band clamp with a large diameter
30 Clamping face
31 First holding body
33 Second holding body
35 Cone/hollow cone pairing
35A Cone
35B Hollow cone
35F Cone flanks
100 Side handle
200 Electric hand-held power tool
210 Machine neck
AA Working axis
DA Axis of rotation
D1 First diameter
D2 Second diameter
EZ Unclamped state
KR Crown toothing
K1 First curvature
K2 Second curvature
OF Surface portion
RR Radial direction
SZ Clamped state
VT Remaining part
V Volume
W Wave

What is claimed is:

1. A side handle for an electric hand-held power tool, the side handle comprising:

a grip region designed to be gripped by a user; and a clamp, the side handle releasably fastenable via the clamp to a machine neck of the hand-held power tool, the clamp having an operating element, the clamp movable between a clamped state and an unclamped state via the operating element, the operating element, when the clamp is in the clamped state, being flush with a surface of the grip region, the clamp having two clamping bodies in the form of cylinder portions, each oriented coaxially with a clamping screw, extending along an axis of rotation of the clamp, the two clamping bodies being formed in a complementary manner to one another so that the two clamping bodies rest against one another to extend along the axis with a first length in the unclamped state and with a second length in the clamped state, the second length being longer than the first length.

2. The side handle as recited in claim 1 wherein the operating element is in the form of a clamping lever.

3. The side handle as recited in claim 2 wherein the clamping lever is arranged on the side handle so as to be rotatable about an axis of rotation relative to the grip region, the axis of rotation extending perpendicularly to a working axis of the hand-held power tool when the side handle is fastened to the hand-held power tool.

4. The side handle as recited in claim 3 wherein a rotation of the clamping lever about the axis of rotation is limited to 180 degrees.

5. The side handle as recited in claim 3 wherein a rotation of the clamping lever about the axis of rotation is limited to 360 degrees.

6. The side handle as recited in claim 5 wherein the clamping lever has a stop.

7. The side handle as recited in claim 6 wherein the grip region has a counterpart stop provided on the grip region for interacting with the stop.

8. The side handle as recited in claim 1 wherein the clamp has a band holder and a band for encircling the machine neck and wherein the band holder has two mutually coaxial holding bodies, at least a first of the holding bodies clampable together with a first of the two clamping bodies in the form of a cylinder portion.

9. The side handle as recited in claim 8 wherein the first of the holding bodies is clampable via a cone/hollow cone pairing to the first of the two clamping bodies.

10. The side handle as recited in claim 8 wherein the band holder or one of the two holding bodies has, on a side facing the machine neck, at least one surface portion having a higher coefficient of friction or a higher modulus of elasticity than a remaining part of the band holder.

11. The side handle as recited in claim 8 wherein the first holding body and the first clamping body have a crown toothing engaged in the clamped state and disengaged in the unclamped state.

12. The side handle as recited in claim 1 wherein the clamp has a band holder and a band for encircling the machine neck.

13. The side handle as recited in claim 12 wherein the band is mounted in the band holder without a clamping screw passing through the band.

14. The side handle as recited in claim 12 wherein the band holder has a depression, recessed in a radial direction, with a holding lug.

15. The side handle as recited in claim 14 wherein the holding lug has a spring contact face, a curvature of the spring contact face being greater than a curvature of a clamping face of the band holder in contact with the machine neck.

16. The side handle as recited in claim 12 wherein the band holder has, on a side facing the machine neck, at least one surface portion having a higher coefficient of friction or a higher modulus of elasticity than a remaining part of the band holder.

17. The side handle as recited in claim 1 wherein the first length is a minimal length of the two clamping bodies resting against each other.

18. The side handle as recited in claim 1 wherein the second length is a maximum length of the two clamping bodies while still being in contact with each other.

19. A side handle for an electric hand-held power tool, the side handle comprising:

a grip region designed to be gripped by a user; and a clamp, the side handle releasably fastenable via the clamp to a machine neck of the hand-held power tool, the clamp having an operating element, the clamp movable between a clamped state and an unclamped state via the operating element, the operating element, when the clamp is in the clamped state, being flush with a surface of the grip region, the clamp having two clamping bodies in the form of cylinder portions, each oriented coaxially with a clamping screw, extending along an axis of rotation of the clamp, wherein the clamp has a band holder and a band for encircling the machine neck and wherein the band holder has two mutually coaxial holding bodies, at least a first of the holding bodies clampable together with a first of the two clamping bodies in the form of a cylinder portion.

20. The side handle as recited in claim 19 wherein the first of the holding bodies is clampable via a cone/hollow cone pairing to the first of the two clamping bodies.

21. The side handle as recited in claim 19 wherein the band holder or one of the two holding bodies has, on a side facing the machine neck, at least one surface portion having a higher coefficient of friction or a higher modulus of elasticity than a remaining part of the band holder.

* * * * *